United States Patent [19]

Maytham

[11] 3,969,818
[45] July 20, 1976

[54] CABLE INSULATION STRIPPING TOOL

[75] Inventor: Walter J. Maytham, Los Altos, Calif.

[73] Assignee: Speed Systems, Inc., Los Altos, Calif.

[22] Filed: Oct. 8, 1975

[21] Appl. No.: 620,632

[52] U.S. Cl. .............................................. 30/90.1
[51] Int. Cl.² ........................................ H02G 1/12
[58] Field of Search ................. 30/90.1, 91.2, 90.2, 30/90.9; 81/9.5 R, 9.5 C

[56] References Cited
UNITED STATES PATENTS

| | | | |
|---|---|---|---|
| 3,377,891 | 4/1968 | Horrocks | 81/9.5 C |
| 3,398,610 | 8/1968 | Matthews | 81/9.5 C |
| 3,601,891 | 8/1971 | Destito | 30/90.1 |
| 3,620,104 | 11/1971 | Horrocks | 30/90.1 X |

*Primary Examiner*—Al Lawrence Smith
*Assistant Examiner*—Roscoe V. Parker
*Attorney, Agent, or Firm*—Phillips, Moore, Weissenberger, Lempio & Strabala

[57] ABSTRACT

A tool for removing insulation from a cable includes a plurality of rollers for supporting cables of different diameters, while permitting rotation of the tool relative to the cable. The tool includes a blade which is positioned to cut into the insulation of the cable upon such relative rotation. The axis of rotation of each supporting roller is angled relative to the longitudinal axis of the cable so that the cable and tool move relatively axially upon such relative rotation thereof.

9 Claims, 8 Drawing Figures

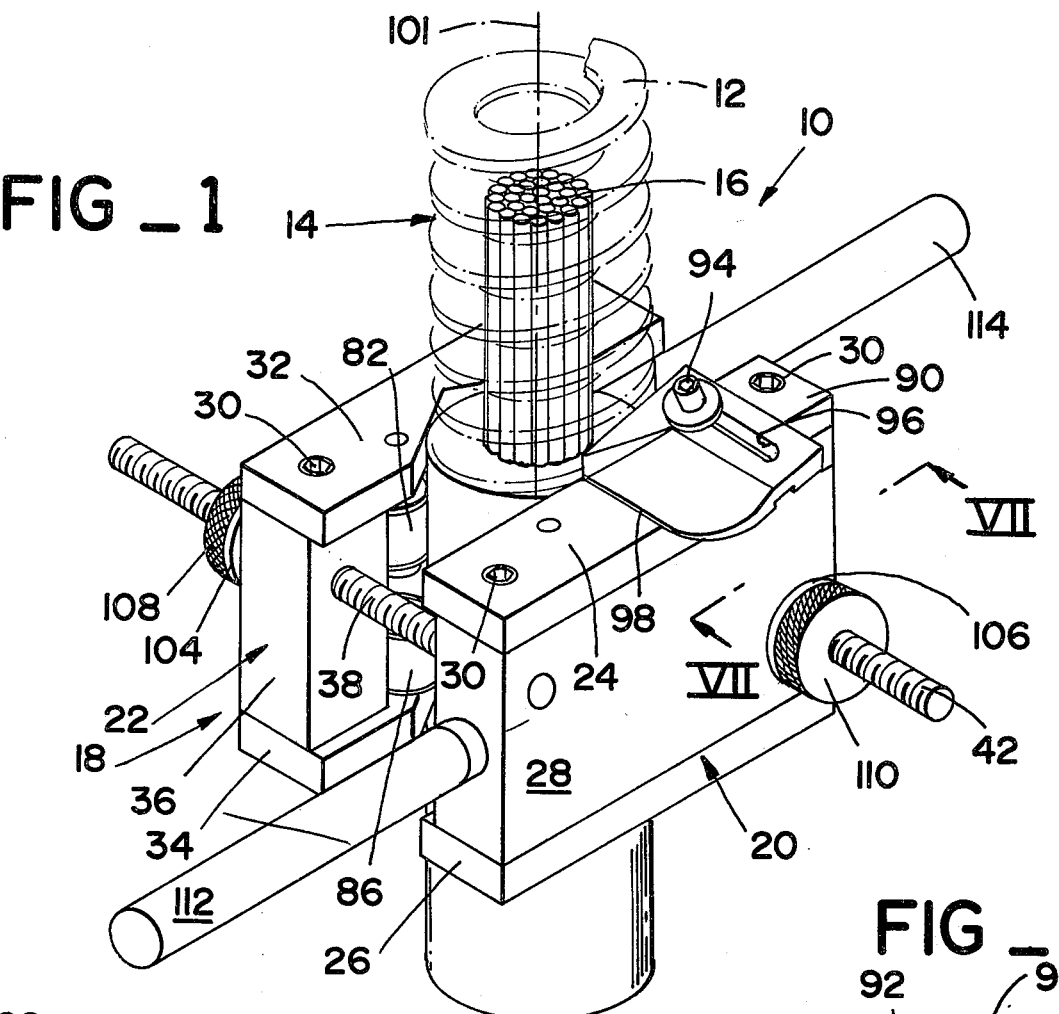
FIG_1
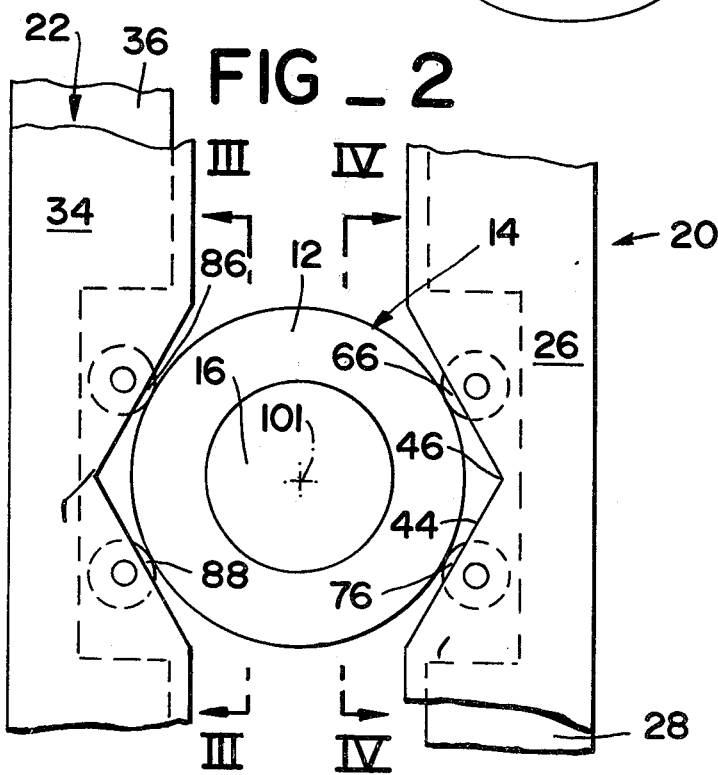
FIG_2
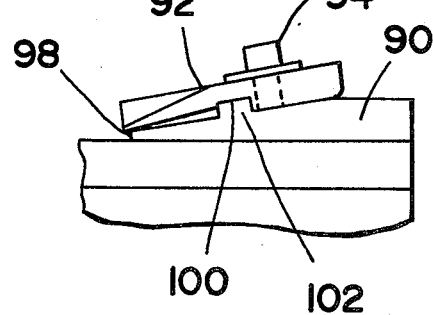
FIG_7
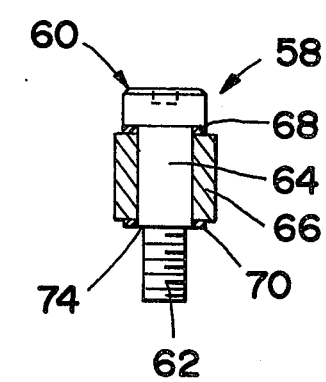
FIG_8

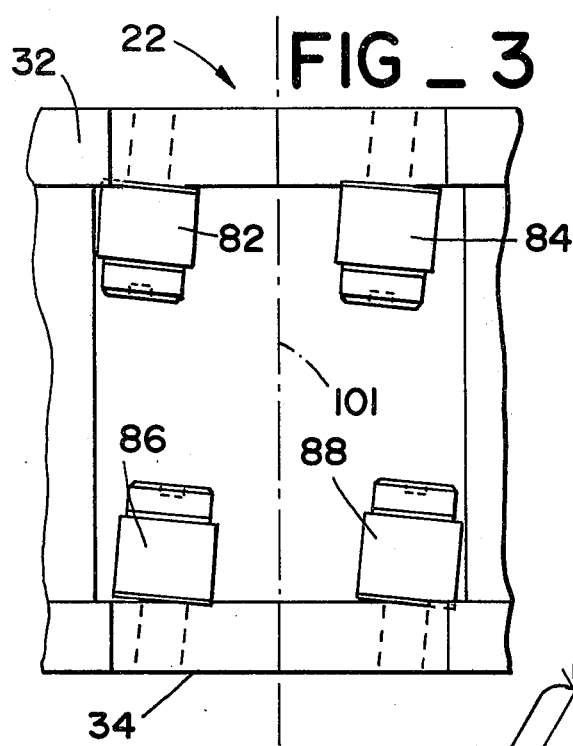
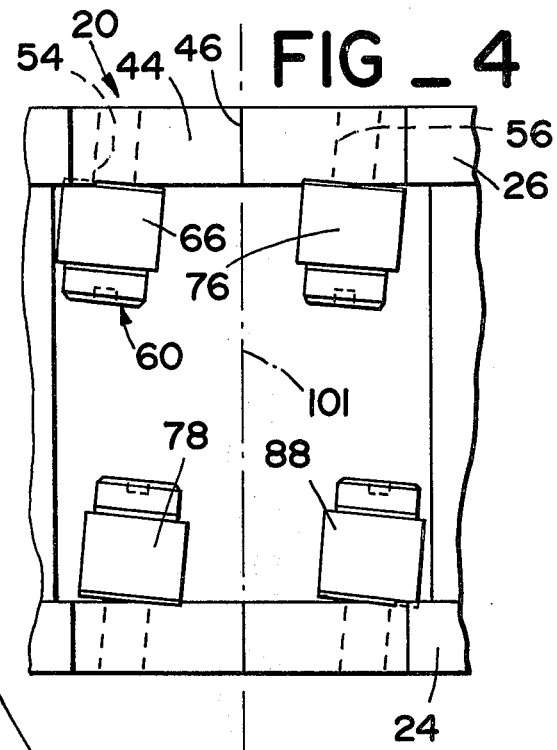
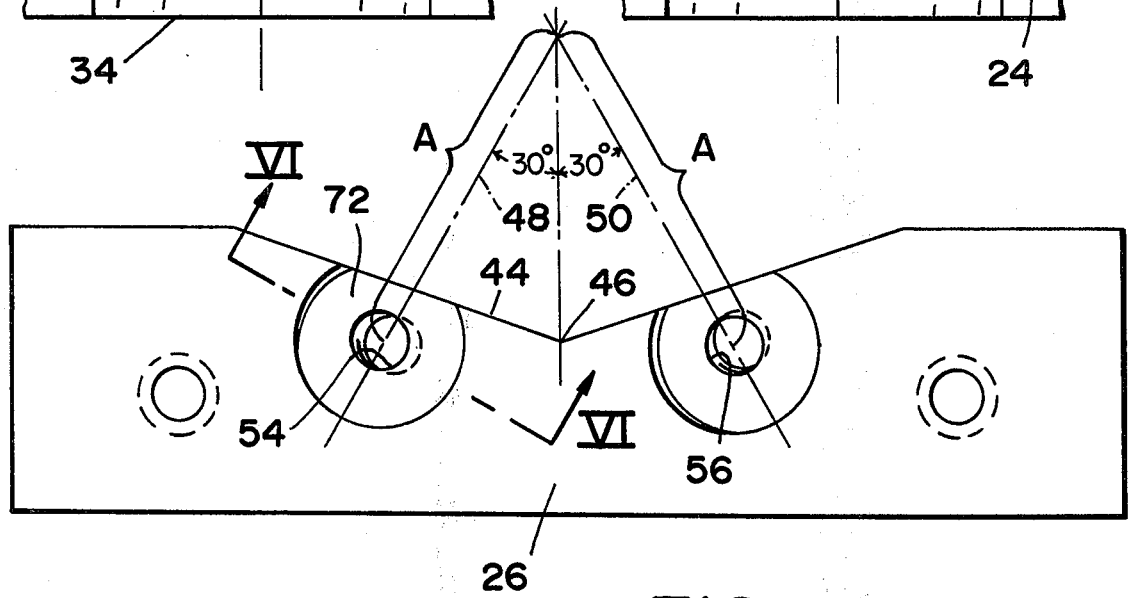
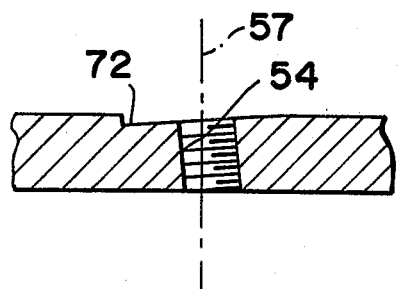

CABLE INSULATION STRIPPING TOOL

BACKGROUND OF THE INVENTION

This invention relates to cable stripping tools, and more particularly, to tools for stripping insulation from electrical conductors.

In the prior art, various devices for stripping insulation from electrical cable have been successfully designed (see, for example, U.S. Pat. No. 3,826,001 to Bilbrey, et al, assigned to the assignee of this invention). In the case of such U.S. Pat. No. 3,826,001, the angular disposition of the blade of the tool relative to the cable may be selectively varied so that such blade will cut a track through the insulation without the application of any axial pressure on either the tool or the cable. Through the choosing of such angular disposition of the blade, the axial thickness of insulation which is cut from a cable at each turn of the tool is determined.

U.S. patent application Ser. No. 550,414 (assigned to the assignee of this invention) discloses a tool wherein an angled blade moves the tool and cable axially upon relative rotation of the tool and cable, with the extent of movement for a turn of the tool and cable relatively limited by placement of a bar in contact with the to-be-cut insulation of the cable.

While such structures have proven effective in operation, it should be understood that an increase in the effectiveness of determining the axial thickness of insulation to be cut for each turn of the tool and cable relatively is always desirable.

SUMMARY OF THE INVENTION

It is accordingly an object of this invention to provide a cable stripping tool which utilizes highly effective means for determining the axial thickness of cable insulation to be cut for each turn of the tool and cable relatively.

It is a further object of this invention to provide a cable stripping tool which, while fulfilling the above object, provides for smooth and efficient rotation of the tool and cable relatively.

It is a still further object of this invention to provide a cable stripping tool which, while fulfilling the above objects, is capable of properly stripping cables of a variety of diameters.

It is a still further object of this invention to provide a cable stripping tool which, while fulfilling the above objects, is extremely simple in design and effective in use.

Broadly stated, the invention comprises a tool for stripping insulation from an insulated conductor cable, comprising body means, and support means mounted to said body means to contact and support a cable seated thereon. The support means comprise roller means rotatably mounted to the body means. The rotational axis of the roller means is angled relative to the longitudinal axis of a cable seated on the support means to provide that, upon relative turning of the body means and cable supported by the support means about the longitudinal axis of the supported cable, the supported cable and body means relatively move generally along the longitudinal axis of the supported cable for each turn of the body means and cable relatively. Blade means are mounted to the body means and have a cutting edge, the blade means being positioned so that upon relative turning of the body means and cable supported by the support means, about the longitudinal axis of the supported cable, the cutting edge cuts the insulation thereof.

BRIEF DESCRIPTION OF THE DRAWINGS

These and other objects of the invention will become apparent from a study of the following specification and drawings, in which:

FIG. 1 is a perspective view of the tool incorporating the invention, and shown in combination with a cable;

FIG. 2 is a rear and elevation of a portion of the apparatus of FIG. 1, also in combination with a cable;

FIG. 3 is a view taken along the line III—III of FIG. 2;

FIG. 4 is a view taken along the line IV—IV of FIG. 2;

FIG. 5 is a side elevation of a plate of the apparatus;

FIG. 6 is a sectional view taken along the line VI—VI of FIG. 5;

FIG. 7 is a view taken along the line VII—VII of FIG. 1; and

FIG. 8 is a sectional view of a roller assembly of the apparatus.

DESCRIPTION OF THE PREFERRED EMBODIMENT

Shown in FIGS. 1 and 2 is a tool 10 for use in removing or stripping insulation 12 from a cable 14, such insulation 12 covering the core or conductor 16 of the cable 14. The cable 14 in this case may have, for example, a diameter of from 1¾ inches to 3¼ inches, and the insulation 12 provided on such cable may include a number of concentric layers of insulating and protective materials, frequently of substantially greater cross-sectional extent than that of the conductor itself. These materials may include, for example, rubber, light metal shieldings, polyvinyl chloride, synthetic elastomers and semiconductors possessing different degrees of thickness and cutting resistance. Thus, the reference to insulation used herein is to be taken to mean any of these layers overlying the core or conductor.

The tool 10 includes body means 18 made up of a body portion 20 and a body portion 22. The body portion 20 is in turn made up of a pair of plates 24, 26, and a spacer 28 to which the plates 24, 26 are secured on either side thereof by means of bolts 30. The body portion 22 is likewise made up of a pair of plates 32, 34, and a spacer 36 to which the plates 32, 34 are secured on either side thereof by means of bolts 30. The plates 24, 26, 32, 34 are identical in configuration, and one is shown in detail in FIGS. 5 and 6.

The spacer 28 has fixed thereto and extending generally perpendicularly therefrom a threaded shaft 38 which extends through an aperture 40 defined by the spacer 36. The spacer 36 also has fixed thereto a threaded shaft 42 disposed generally perpendicular thereto, and extending through an aperture in the spacer 28. The shafts 38, 42 allow movement of the body portions 20, 22 relatively toward and away from each other, through sliding of the shafts 38, 42 and the respective apertures, and the cable 14 is positionable as shown in FIGS. 1 and 2 between the body portions 20, 22 on rollers rotatably mounted to the body portion 20 and rollers rotatably mounted to the body portion 22.

Reference is made to FIGS. 3–6 and 8 in particular in the description of the mounting and construction of the rollers. Referring initially to FIG. 5, it is to be noted that plate 26 defines an indented portion 44 with the base 46 thereof at substantially mid-point of the length of the plate 26. The distance A in FIG. 5 represents the radius of the largest cable on which the tool 10 is designed to operate, in this case, a radius of 1⅝ inches. Two such radius lines are shown at 48, 50 in FIG. 5, one on each side of a line 12 connecting the center of the cable and the base 46 of the indented portion 44, with each line 48, 50 being angled 30° therefrom. Threaded bores 54, 56 are provided in the plate 26, the axes of which are positioned to pass through such radius lines 48, 50 respectively, and with the axes of such bores 54, 56 being perpendicular to such radius lines 48, 50 respectively, but being angled about 1½° relative to a line 57 perpendicular to the plane of the plate 26, i.e., angled approximately 1½° relative to the longitudinal axis 101 of the cable 14. Such angling is shown somewhat exaggerated in FIG. 6 and other FIGS. of the drawings.

A roller assembly 58, one of which is associated with each threaded bore in each plate, is shown in FIG. 8. Such roller assembly 58 includes a bolt 60 having a threaded portion 62 adjacent its extended end and an unthreaded portion 64 about which is disposed a roller 66. Teflon washers 68, 70 are disposed on either side of the roller 66 about the unthreaded portion 64 as shown, and the threaded portion 62 is threadably engaged with a threaded bore (for example bore 54) in a plate, to seat to an extent in a recessed portion (as at 72 of FIG. 6) defined by that plate. It is to be understood, however, that the bolt 60 defines a radial portion or shoulder 74 interconnecting the threaded portion 62 and unthreaded portion 64 which contacts the plate 26 to limit inward threadable engagement of such bolt 60 with the plate 26 and the position of such shoulder 74 is chosen to allow freedom of rotation of the roller 66. The longitudinal axis of the bolt 60 defines the rotational axis of the roller 66, with the longitudinal axis of the bolt 60 being determined by the angling of the threaded aperture in the the plate associated therewith.

It should be understood that each plate is exactly the same in configuration as the plate 26 shown and described in FIG. 5. The roller assemblies in accordance with FIG. 8 are then connected with the respective threaded bores of all four plates, so that the final assembly of the four plates and rollers associated therewith is as shown in FIGS. 3 and 4. That is, plate 26 has rollers 66, 76 rotatably mounted thereto; plate 24 has rollers 78, 80 rotatably mounted thereto; plate 32 has rollers 82, 84 rotatably mounted thereto; and plate 34 has rollers 86, 88 rotatably mounted thereto.

The plate 24 has mounted thereto a spacer 90 to which is in turn mounted a blade 92. A bolt 94 is disposed through a slotted hole 96 defined by the blade 92 and in threaded engagement with the spacer 90. The blade 92, through the utilization of the slotted hole 96, may be adjusted positionwise relative to the body portion 20 to move the cutting edge 98 thereof toward and away from the longitudinal 101 axis of a cable 14 seated on the rollers 66, 76, 78, 80, 82, 84, 86, 88. For providing the guiding of such adjustment motion, the blade 92 defines an elongated recess 100, and the spacer 90 defines an elongated rib 102 positioned and seated in the recess 100, the elongated recess 100 and rib 102 being disposed substantially parallel to the cutting edge 98 of the blade 92.

Washers 104, 106 are disposed on the threaded shafts 38, 42, and nuts 108, 110 are threadably engaged with the respective threaded shafts 38, 42 so that the body portions 20, 22 may be forced together with the cable 14 therebetween upon hand turning of the nuts 108, 110, to seat the cable 14 on the rollers.

In the use of the tool 10, the nuts 108, 110 are backed off shafts 38, 42 to allow the placement of a cable 14 between the body portions 20, 22. Such body portions 20, 22 are then forced together by the turning of the nuts 108, 110 to seat the cable 14 on the rollers 66, 76, 78, 80, 82, 84, 86, 88. The cable 14 is initially seated to bring the insulation 12 into contact with the cutting edge 98 of the blade 92. The tool 10 is rotated about the longitudinal axis 101 of the cable 14 by means of handles 112, 114, respectively fixed to and extending from the spacers 28, 36. The rotational axes of the respective rollers being angled relative to the longitudinal axis 101 of the cable 14, in accordance with the above description, it will be seen that relative turning of the tool 10 and the cable 14 provides that the supported cable 14 and tool 10 relatively moves generally along the longitudinal axis 101 of the supported cable 14 for each turn of the tool 10 and cable 14 relatively. The angling of such rollers thereby provides a cable feed relative to the tool 10, resulting in the blade 92 cutting a certain axial thickness of insulation for each relative turn of the tool 10 and cable 14.

As noted above, each plate 24, 26, 32, 34 is identical in configuration with the others, each plate having mounted thereto a pair of rollers rotatably fixed to such plate. It should also be noted that, in the assembly of such an apparatus, four identical plates 24, 26, 32, 34 are chosen, and a pair of roller assemblies is mounted to each of such plates in identical manner. Each assembly made up of a plate and a pair of rollers may then be positioned anywhere relative to a spacer in accordance with FIG. 1 and secured thereto, i.e., each of the plates with a pair of rollers mounted thereon is interchangeable with any other plate with a pair of rollers mounted thereon, with the end result being that the tool 10 will operate exactly in the same manner no matter where each of these individual assemblies is placed.

It should be noted that each pair of rollers associated with a plate is mounted inwardly of such plate, so that no rollers extend outwardly of the outer overall surface of the tool 10. This results in an extremely compact and efficient structure.

While it has been noted above that it has been found advantageous to angle the rotational axis of each roller approximately 1½° relative to the longitudinal axis of a supported cable seated on the rollers, other angles might advantageously be chosen. For example, depending on the diameter of the cable and the overall size of the tool, the axis of each roller may with advantage be angled between the limits 0° to 15° relative to the longitudinal axis of a cable seated on such rollers.

It will be seen that simple and effective means are provided for feeding a cable through a cutting tool upon rotation of the tool about the longitudinal axis of the cable. During such rotation, as set forth above, the insulation of the cable is effectively cut. The angled roller means provide for an extremely smooth and efficient operation, requiring relatively little turning force of the tool about such longitudinal axis of the cable.

What is claimed is:

1. A tool for stripping insulation from an insulated conductor cable, comprising:
   body means;
   support means mounted to said body means to contact and support a cable seated thereon, said support means comprising roller means rotatably mounted to the body means, the rotational axis of the roller means being angled relative to the longitudinal axis of a cable seated on said support means to provide that, upon relative turning of the body means and cable supported by the support means about the longitudinal axis of the supported cable, the supported cable and body means relatively move generally along the longitudinal axis of the supported cable for each turn of the body means and cable relatively; and blade means mounted to said body means and having a cutting edge, the blade means being positioned so that upon relative turning of the body means and cable supported by the support means, about the longitudinal axis of the supported cable, the cutting edge cuts the insulation thereof.

2. The apparatus of claim 1 wherein said roller means comprise a plurality of rollers rotatably mounted to the body means, the rotational axis of each roller being angled relative the longitudinal axis of a cable seated on said rollers.

3. The apparatus of claim 2 wherein said body means comprise a first body portion and a second body portion, between which a cable is positionable, and wherein the first and second body portions are movable relatively toward and away from each other, and wherein the plurality of rollers comprise a first plurality of rollers rotatably secured to said first body portion, and a second plurality of rollers rotatably secured to said second body portion, and means for forcing the first and second body portions relatively together to seat a cable disposed therebetween on said rollers.

4. The apparatus of claim 3 wherein the first body portion comprises first and second plates, and a spacer member to which a first and second plates are secured, and wherein the first plurality of rollers comprise a first pair of rollers rotatably fixed to the first plate, and a second pair of rollers rotatably fixed to the second plate, and wherein the second body portion comprises a third and fourth plates, and a spacer member to which the third and fourth plates are secured, and wherein the second plurality of rollers comprise a third pair of rollers rotatably secured to the third plate, and a fourth pair of rollers rotatably secured to the fourth plate.

5. The apparatus of claim 4 wherein the first and second pairs of rollers are positioned inwardly of the first and second plates respectively, and the third and fourth pairs of rollers are positioned inwardly of the third and fourth plates respectively.

6. The apparatus of claim 5 wherein the rotational axis of each roller is angled between the limits of 0° to 15° relative to the longitudinal axis of a cable seated on said rollers.

7. The apparatus of claim 6 wherein the rotational axis of each roller is angled approximately 1½° relative to the longitudinal axis of a supported cable seated on said rollers.

8. The apparatus of claim 1 wherein the roller means are angled between the limits of 0° to 15° relative to the longitudinal axis of a cable seated on the support means.

9. The apparatus of claim 8 wherein the rotational axis of the roller means is angled approximately 1½° relative to the longitudinal axis of a cable seated on the support means.

* * * * *